(12) United States Patent
Beatty et al.

(10) Patent No.: US 6,554,485 B1
(45) Date of Patent: Apr. 29, 2003

(54) TRANSLUCENT DUST CAP AND ASSOCIATED METHOD FOR TESTING THE CONTINUITY OF AN OPTICAL FIBER JUMPER

(75) Inventors: John W. Beatty, Newton, NC (US); Dennis M. Knecht, Hickory, NC (US); James R. Merriken, Hudson, NC (US)

(73) Assignee: Corning Cable Systems LLC, Hickory, NC (US)

( * ) Notice: Subject to any disclaimer, the term of this patent is extended or adjusted under 35 U.S.C. 154(b) by 255 days.

(21) Appl. No.: 09/658,355

(22) Filed: Sep. 11, 2000

(51) Int. Cl.$^7$ ................................................. G02B 6/38
(52) U.S. Cl. ......................................... 385/72; 385/70
(58) Field of Search .......................... 385/78, 88, 53, 385/70–76, 139, 134

(56) References Cited

U.S. PATENT DOCUMENTS

| | | | |
|---|---|---|---|
| 4,413,880 A | * 11/1983 | Forrest et al. | ................. 385/78 |
| 4,770,488 A | * 9/1988 | Shank et al. | ................. 385/79 |
| 5,461,693 A | * 10/1995 | Pimpinella | .................. 385/135 |
| 5,472,015 A | * 12/1995 | Chiou | .......................... 137/556 |
| 5,825,954 A | * 10/1998 | Dunn et al. | ..................... 385/79 |
| 6,318,903 B1 | * 11/2001 | Andrews et al. | .............. 385/77 |
| 6,394,662 B1 | * 5/2002 | Foster | .......................... 385/60 |

* cited by examiner

Primary Examiner—Michael P. Stafira
Assistant Examiner—Juan D Valentin, II

(57) ABSTRACT

A dust cap is provided that includes a translucent end member that permits optical communication while the dust cap remains mounted upon a ferrule. The dust cap includes a sleeve having an open first end and an opposed second end that is closed by the translucent end member. The end member can also include a lens to facilitate optical communication. A medial portion of the sleeve can also define an internal chamfer that extends radially inward for engaging the ferrule such that the front face of the ferrule is spaced from the second end of the sleeve, thereby preventing contaminants from being transferred from the second end of the sleeve to the polished front face of the ferrule. The dust cap can also define a groove extending lengthwise through only a portion of the sleeve, i.e., from the first end of the sleeve to a medial portion of the sleeve. The groove therefore permits air to vent from the bore while the dust cap is being mounted upon the ferrule, while isolating the front face of the ferrule from the external environment once the dust cap has been fully mounted, thereby protecting the polished front face of the ferrule from contaminants that may enter the groove. A method is also provided for testing the continuity of an optical fiber jumper that utilizes optical communications conducted through the translucent dust caps.

4 Claims, 4 Drawing Sheets

TRANSLUCENT DUST CAP AND ASSOCIATED METHOD FOR TESTING THE CONTINUITY OF AN OPTICAL FIBER JUMPER

FIELD OF THE INVENTION

The present invention relates generally to dust caps that are mounted upon ferrules to protect the front faces of the ferrules from contaminants and, more particularly, relates to translucent dust caps and an associated method for testing the continuity of an optical fiber jumper that has translucent dust caps mounted upon the opposed ends thereof.

BACKGROUND OF THE INVENTION

Once a fiber optic connector has been mounted upon the end portion of an optical fiber and the front face of the ferrule of the fiber optic connector has been polished, a dust cap is commonly mounted upon the ferrule. The dust cap protects the polished front face of the ferrule from contaminants or other debris that would otherwise degrade the performance of the resulting optical system. For example, fiber optic connectors are generally mounted upon the opposed ends of an optical fiber jumper during the manufacturing process. In order to protect the front faces of the ferrules of the fiber optic connectors from contaminants and other debris following the polishing of the front faces of the ferrules, dust caps are typically mounted upon the ferrules prior to packaging and shipping the optical fiber jumper.

Conventional dust caps are fabricated from an opaque plastic material, such as a low density polyethylene material. This material is advantageous in that it is relatively inexpensive. Unfortunately, conventional dust caps tend to bleed off a plasticizer that can be transferred to and contaminate the front face of the ferrule. A conventional dust cap includes a sleeve that defines a bore extending lengthwise between opposed first and second ends. The first end of a conventional dust cap is open to permit the ferrule to be inserted into the bore. In contrast, the second end of the dust cap is closed. A conventional dust cap is generally designed to be mounted upon a ferrule by inserting the front face of the ferrule through the open first end of the dust cap and into the bore and thereafter slideably advancing the dust cap upon the ferrule. The slideable advancement of the dust cap typically continues until the first end of the dust cap contacts an inwardly extending flange of the inner housing of the fiber optic connector. A conventional dust cap therefore defines a straight bore having a constant diameter that equals or slightly exceeds the diameter of the ferrule and that is slightly longer than the length of the ferrule that is anticipated to be inserted into the dust cap. As such, the front face of the ferrule does not generally contact the closed second end of the dust cap and thereby avoids picking up contaminants or other debris carried by the second end of the dust cap.

A dust cap is typically molded about a pin that defines the bore. Upon pulling the pin out of the dust cap following the molding process, flakes of material may be pulled outwardly from the second end of the dust cap so as to extend into the bore. In some instances, these flakes of material contact the front face of the ferrule once the dust cap is mounted thereupon. In instances in which flakes of material from the second end of the dust cap do contact the front face of the ferrule, contaminants or other debris can be transferred to the front face of the ferrule even though the front face of the ferrule is otherwise spaced slightly from the second end of the dust cap.

In order to facilitate the mounting of a dust cap upon a ferrule, a conventional dust cap also typically defines a groove that opens into the bore and that extends lengthwise from the first end of the dust cap through the entire bore. As will be apparent, the groove facilitates the mounting of a dust cap upon a ferrule by permitting air that would otherwise be trapped within the bore between the front face of the ferrule and the second end of the dust cap to escape. Since the groove runs the length of the bore, however, contaminants and other debris can also enter the bore via the groove even after the dust cap has been fully mounted upon the ferrule. These contaminants and other debris that enter via the groove may disadvantageously be deposited upon the front face of the ferrule.

The removal of the dust cap from a ferrule will obviously expose the front face of the ferrule to contaminants and other debris. Moreover, the removal of the dust cap from the ferrule will also electrically charge the ferrule such that contaminants and other debris are electrically attracted to the ferrule. As such, it is desirable for the dust cap to remain on the ferrule from immediately following the polishing of the front face of the ferrule to some time immediately preceding the interconnection of the fiber optic connector during installation of the optical fiber. Unfortunately, a dust cap must typically be removed at least once after its initial mounting upon the ferrule following the polishing of the front face of the ferrule and prior to its ultimate removal from the ferrule in the course of installing the optical fiber.

For example, during a conventional manufacturing process in which fiber optic connectors are mounted upon the end portions of one or more optical fibers, such as during the fabrication of optical fiber jumpers, the front face of the ferrule is typically polished and the optical fiber jumper is then subjected to performance tests, including tests that measure the insertion loss and the back reflection prior to mounting a dust cap upon the ferrule. After mounting the dust cap upon the ferrule, an outer shroud is assembled to the inner housing and a boot is inserted into the rear of the outer shroud in order to complete the assembly of the fiber optic connector.

Even though performance tests were conducted following the polishing of the front faces of the ferrules, optical fiber jumpers must generally be tested again for optical continuity immediately prior to being packaged and shipped to a customer in order to minimize the number of defective optical fiber jumpers that are delivered. In this regard, a continuity test is generally desirable since the assembly of the outer shroud and the boot following the prior performance testing and the mounting of the dust cap upon the ferrule could have broken an optical fiber or otherwise impaired the continuity of the optical fiber jumper. The opaque dust caps must therefore be removed from both ends of the optical fiber jumper to permit the continuity of the optical fiber jumper to be tested. If the optical fiber jumper passes the continuity test, the dust caps are then remounted upon the respective ferrules prior to packaging and shipping the optical fiber jumper to a customer. During the relatively brief time in which the dust caps are removed from the respective ferrules, however, contaminants and other debris may be deposited upon the front faces of the ferrules, especially in light of the, electrical charge that may be imparted to the ferrules upon removing the dust caps therefrom. Thus, the resulting system performance may be degraded once the optical fiber jumper is installed due to the contaminants and other debris that are deposited upon the front faces of the ferrules.

SUMMARY OF THE INVENTION

A dust cap is therefore provided that addresses these and other shortcomings of conventional dust caps in order to further reduce the opportunity for contaminants and other debris to be deposited upon the polished front face of a ferrule. The dust cap can be constructed such that at least the closed end is translucent in order to permit optical communication with an optical fiber upon which the ferrule is mounted while the dust cap remains mounted upon the ferrule, such as during continuity testing. The dust cap can also include an internal chamfer that extends radially inward for engaging the ferrule in order to insure that the front face of the ferrule is adequately spaced from the closed end of the dust cap, thereby preventing the transfer of contaminants or other debris from the closed end of the dust cap to the polished front face of the ferrule. In addition, a dust cap can define a groove that is designed to vent air during the mounting of the dust cap upon a ferrule, but that extends only to a medial portion of the dust cap in order to prevent contaminants or other debris from passing through the groove and being deposited upon the front face of the ferrule once the dust cap has been fully mounted upon the ferrule. A method for checking the continuity of an optical fiber jumper is also provided in which the translucent dust caps remain mounted upon the respective ferrules while light is introduced into one end of the optical fiber jumper and light is emitted from and monitored at the other end of the optical fiber jumper. Accordingly, the dust cap of the present invention advantageously permits the continuity of an optical fiber jumper or other types of optical fibers to be confirmed without having to remove the dust caps from the respective ferrules that would subject the front faces of the ferrules to contaminants or other debris and subsequently impair the system performance once the optical fiber jumper was installed.

The dust cap includes a sleeve extending lengthwise between opposed first and second ends. The sleeve defines a lengthwise extending bore that opens through the first end for receiving at least a portion of the ferrule. The dust cap also includes an end member for closing the second end of the sleeve. In one advantageous embodiment, at least the end member is translucent for permitting optical communication with the optical fiber upon which the ferrule is mounted while the dust cap remains mounted upon the ferrule. Typically, the sleeve and the end member are integral such that the sleeve is also translucent. For example, both the sleeve and the end member can be formed of nylon. According to this embodiment, the end member can also include a lens. For example, the lens can include an outer planoconvex lens proximate the outer surface of the end member. Additionally, the lens can include an inner lens proximate the inner surface of the end member. In either instance, the lens serves to focus incident optical signals upon the optical fiber upon which the ferrule is mounted and to expand optical signals emitted by the optical fiber in order to facilitate optical communication therewith.

In one embodiment, a medial portion of the sleeve defines an internal chamfer that extends radially inward for engaging the ferrule such that the front face of the ferrule is spaced from the second end of the sleeve. Thus, contaminants and other debris will not be transferred from the closed second end of the sleeve to the polished front face of the ferrule. In this embodiment, the portion of the bore extending between the first end of the sleeve and the internal chamfer generally has a larger diameter than the portion of the bore extending between the internal chamfer and the second end of the sleeve.

The dust cap of one embodiment of the present invention also defines a groove opening into the bore and extending lengthwise through only a portion of the sleeve. In this regard, the sleeve defines the groove to extend only from the first end of the sleeve to a medial portion of the sleeve. Preferably, the medial portion of the sleeve to which the groove extends is selected such that the front face of the ferrule will be positioned between the medial portion of the sleeve and the second end of the sleeve. In one embodiment, for example, the sleeve defines the groove to extend only from the first end of the sleeve to the medial portion of the sleeve that defines the internal chamfer. Thus, even though the groove permits air to vent from the bore while the dust cap is being mounted upon the ferrule, the front face of the ferrule will be isolated from the groove and, in turn, from the external environment once the dust cap has been fully mounted upon the ferrule, thereby protecting the polished front face of the ferrule from contaminants and other debris that may enter the groove.

A method is also provided according to one embodiment of the present invention for testing the continuity of an optical fiber jumper. In this regard, the optical fiber jumper includes at least one optical fiber, first and second fiber optic connectors including respective ferrules mounted upon opposed ends of the at least one optical fiber and at least one dust cap having a translucent end member mounted upon a respective ferrule. According to this method, light is introduced into one end of the optical fiber and the light emitted by the other end of the at least one optical fiber is monitored to test the continuity of the optical fiber jumper while the at least one dust cap remains mounted upon the respective ferrule. More commonly, the optical fiber jumper includes first and second dust caps with translucent end members mounted upon the ferrules of the first and second fiber optic connectors, respectively. In one advantageous embodiment, the end member of each dust cap includes a lens such that introducing light into one end of the least one optical fiber also includes focusing light into one end of the at least one optical fiber. Conversely, monitoring the emitted light also includes expanding the light emitted by the other end of the at least one optical fiber. As such, the continuity of an optical fiber jumper can be checked without having to remove the dust caps from the respective ferrules that would disadvantageously expose the polished front faces of the ferrules to contaminants and other debris. By providing a dust cap and an associated method for testing the continuity of an optical fiber jumper without having to remove the dust caps, the resulting performance of the optical fiber jumper should be improved since the polished front faces of the ferrules will generally have fewer contaminants and other debris than conventional ferrules.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers-refer to like elements throughout.

Figure 1:
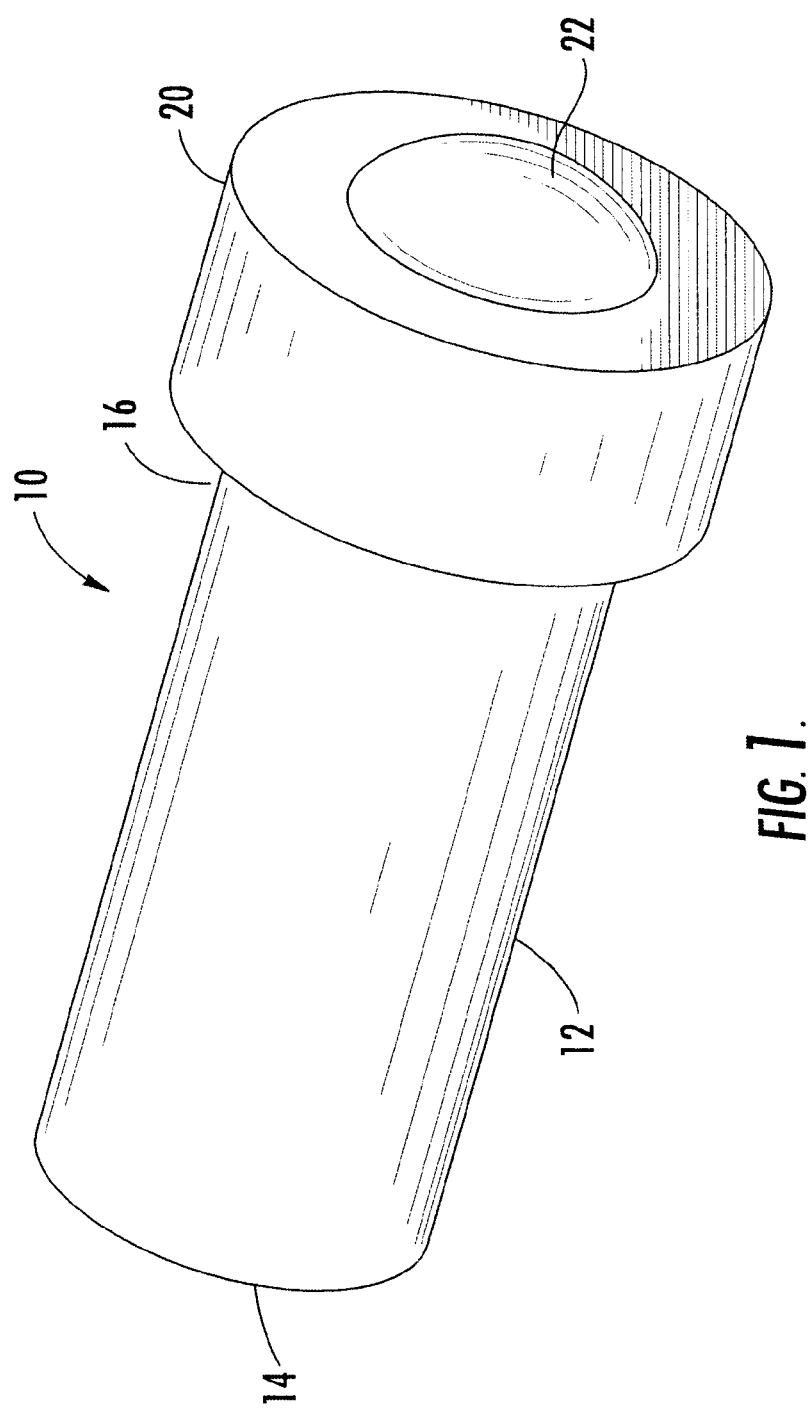
FIG. 1 is a perspective view of a dust cap according to one embodiment of the present invention that illustrates an end member having a lens.
Figure 2:
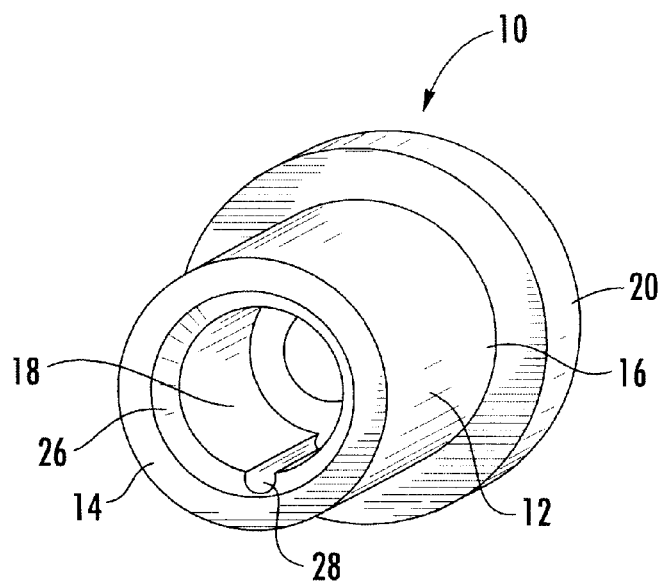
FIG. 2 is a perspective view of a dust cap according to one embodiment of the present invention that partially illustrates the bore defined by the sleeve of the dust cap.

Referring now to FIG. 1, the dust cap 10 according to one embodiment of the present invention is depicted. As described in more detail below, the dust cap is designed to be mounted upon a ferrule in order to protect the front face of the ferrule from contaminants and other debris. The dust cap includes a sleeve 12 that extends lengthwise between opposed first and second ends 14, 16. While the sleeve is depicted to have a generally cylindrical outer surface, the sleeve can be shaped differently as long as the sleeve does not interfere with the mounting of the dust cap upon the ferrule. As depicted in more detail in FIGS. 2 and 3, the sleeve defines a lengthwise extending bore 18 that opens through the first end for receiving at least a portion of the ferrule.

The dust cap 10 also includes an end member 20 for closing the second end 16 of the sleeve 12. While the end member and the sleeve can be discrete components, the end member and the sleeve are typically integrally formed, such as by molding. According to one advantageous aspect of the present invention, at least the end member is translucent such that optical signals can be transmitted therethrough. Although the end member can be formed of a variety of materials having different optical transmissivities, the end member is preferably formed of a material that is relatively optically clear. In one embodiment, for example, the end member is formed of nylon 12 that is optically clear and that does not allow as much plasticizer to bleed off as does the material from which conventional dust caps are formed. Nylon 12 is commercially available as TR90 Grilamid by EMS-Chemie, Inc., of Sumter, S.C. However, the end member can be formed of other optically clear materials. In addition, air is preferably vented during the molding process to reduce the amount of air that is trapped inside of the bore 18 by the mold pin that defines the bore since this air may create bubbles in the resulting dust cap, which can somewhat impair the optical transmissivity of the dust cap. Although the optical signals transmitted through the dust cap are transmitted through the end member as described below, the entire dust cap including the sleeve and the end member can be integrally formed from the same translucent material, such as nylon 12, if so desired. In this regard, not only is nylon 12 optically clear, but nylon 12 is relatively hard and does not shrink much following the molding process such that the resulting dimensions of the dust cap, including the diameter and length of the bore defined by the sleeve, can be precisely and consistently defined.

Figure 3:
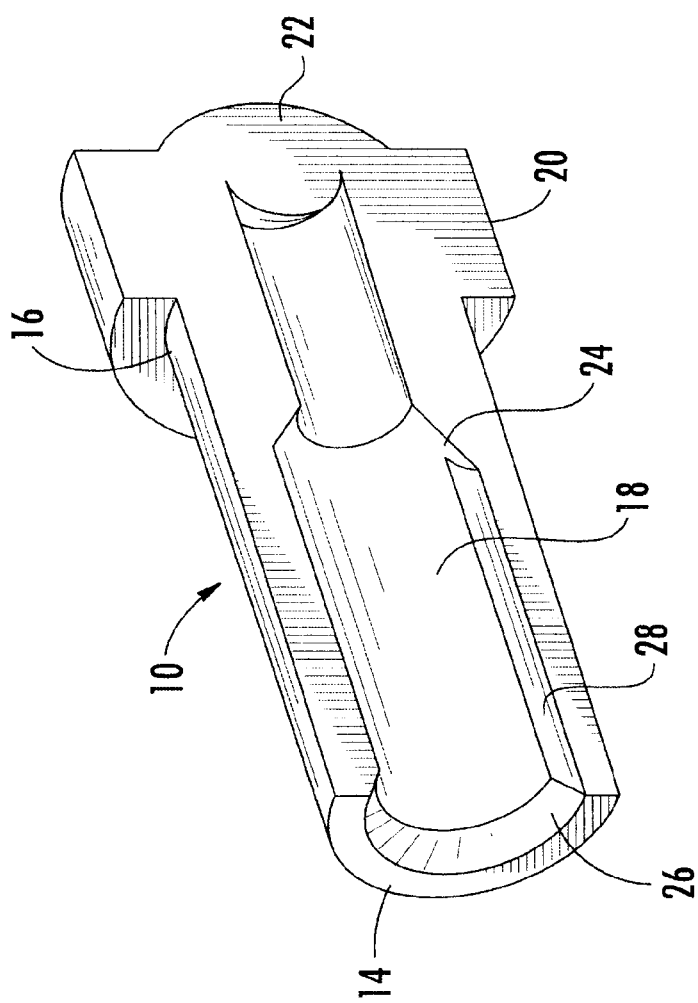
FIG. 3 is a cross-sectional perspective view of the dust cap of FIGS. 1 and 2 depicting the bore defined by the sleeve of the dust cap in more detail.
Figure 4:
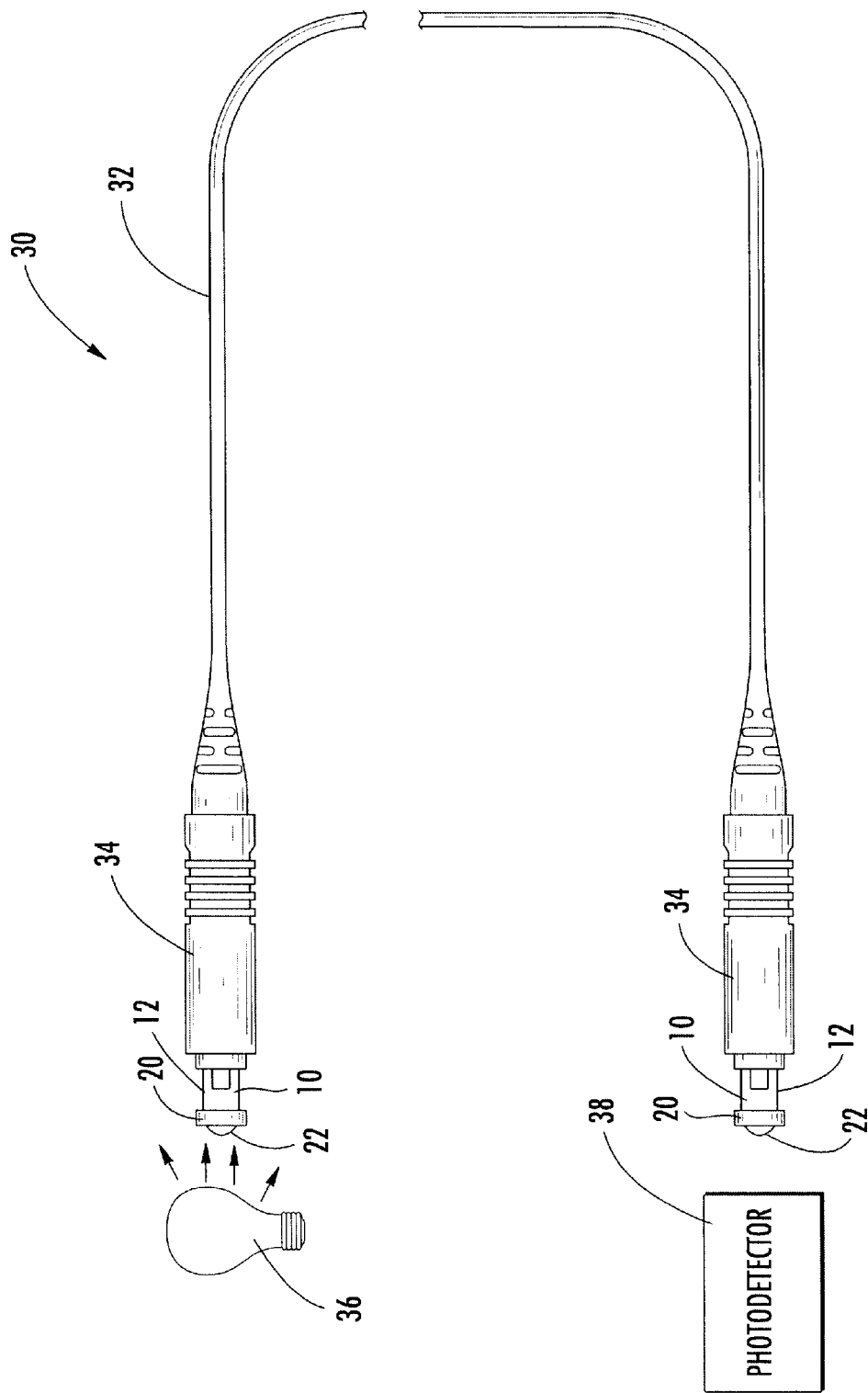
FIG. 4 is a schematic representation of the operations performed to check the continuity of an optical fiber jumper according to one embodiment of the present invention.

In order to improve the optical transmission, the end member 20 of the dust cap 10 can include a lens 22. Typically, the lens is integral with the remainder of the end member and is formed of the same material, such as nylon 12. However, the lens is shaped so as to focus incoming optical signals and to expand outgoing optical signals, as described below. In one advantageous embodiment, the lens is a planoconvex lens proximate the outer surface of the end member. While the inner surface of the end member can be flat or planar, the end member can also include an inner lens, also typically a planoconvex lens, as depicted in FIG. 3. As also illustrated, the outer lens preferably has a diameter that exceeds the diameter of that portion of the bore 18 proximate the second end 16 of the sleeve to insure that the outer lens effectively collects the incoming and outgoing optical signals. For example, the outer lens can cover the entire outer surface of the end member, if so desired. The lens can be designed to have any desired optical characteristics, including any desired magnification and focal length.

In one embodiment, however, the outer lens has a magnification of 2× and a focal length that coincides with the front face of the ferrule as described in more detail below.

Although the end member 20 can have the same size and shape as the sleeve 12, the end member is typically larger in radial cross-section. Although the end members is shown to be substantially cylindrical in shape, a variety of shapes is possible. An appropriately shaped end member can be easily grasped during the process of assembling and mounting a fiber optic connector. For example, the enlarged end member shown in the figures can be readily engaged by a pick and place machine during an automated connector assembly process.

Figure 5:
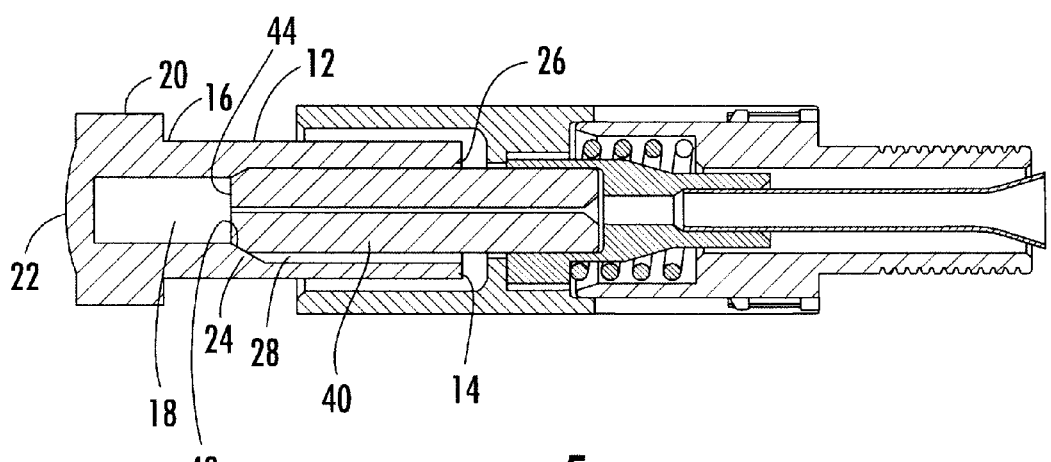
FIG. 5 is a cross-sectional view of the dust cap mounted on a representative fiber optic connector.

In order to insure that the front face of the ferrule is appropriately spaced from the second end 16 of the sleeve 12 and, more particularly, from the lens 22, the sleeve can define an internal chamfer 24 for engaging the ferrule. As depicted in FIGS. 3 and 5, for example, the medial portion of the sleeve can define an internal chamfer that extends radially inward. In one embodiment, the internal chamfer also extends in an axial direction such that the chamfer is disposed at an angle, such as 30 degrees, relative to the longitudinal axis defined by the bore 18. As illustrated in FIG. 3, the portion of the bore extending between the first end 14 of the sleeve and the internal chamfer typically has a larger diameter than the portion of the bore extending between the internal chamfer and the second end of the sleeve. In this regard, the first portion of the bore generally has the same shape as the portion of the ferrule upon which the dust cap 10 will be mounted. In addition, the first portion of the bore is preferably sized to have either the same size or, more typically, to be slightly larger than the portion of the ferrule upon which the dust cap will be mounted. In the illustrated embodiment, for example, the first portion of the bore is cylindrical and has a diameter that is slightly larger (about 0.2 mm) than the diameter of the bore at the internal chamfer. In contrast, the second portion of the bore can have a variety of shapes and sizes since the ferrule will not extend for any great length therethrough. For example, the second portion of the bore can be frustoconical so as to expand in diameter from the internal chamfer toward the second end of the sleeve in order to facilitate optical communications via the lens. Typically, however, the second portion of the bore is sized somewhat smaller than the first portion of the bore and has the same general shape as the first portion of the bore, such as a cylindrical shape as depicted in FIGS. 3 and 5. Since the front face of the ferrule will be inserted into the second portion of the bore, the second portion of the bore is preferably sized to be equal in size or slightly larger than the front face of the ferrule. See FIG. 5.

FIG. 5 illustrates in cross section, an SC connector with the dust cap 10 mounted upon a ferrule 40. The front face 49 of the ferrule is inserted into the first end 14 of the sleeve 12 and dust cap is advanced over the ferrule. The dust cap is typically slid over the ferrule until the ferrule or, as shown in FIG. 5, the ferrule chamfer 42 contacts the internal chamfer 24 of the dust cap. The dust cap, while shown as being designed to be mounted upon the cylindrical SC ferrule where the front face of the ferrule is slightly smaller in cross section than the shank of the ferrule, the dust cap can be designed to be mounted upon a variety of ferrules. Once the dust cap is properly seated upon the ferrule, the front face 44 of the ferrule, including the ends of the optical fibers (not shown) upon which the ferrule is mounted, is disposed within the second portion of the bore.

In order to facilitate the mounting of the dust cap 10 upon the ferrule, the first end 14 of the sleeve 12 can also include a chamfered lead in surface 26. In addition, the sleeve can define a groove 28 that extends lengthwise through only a portion of the bore 18. In this regard, the sleeve is preferably designed such that the groove extends from the first end to a medial portion of the sleeve with the medial portion of the sleeve being selected such that the front face of the ferrule is beyond the medial portion of the sleeve, i.e., is closer to the second end 16 of the sleeve, once the dust cap is fully mounted upon the ferrule. In the illustrated embodiment in FIG. 3, for example, the groove extends from the first end of the sleeve to the internal chamfer 24. As such, the groove serves to vent air from within the bore as the dust cap is slideably advanced over the ferrule. Thus, the dust cap can be more easily mounted upon the ferrule. Once the dust cap is fully mounted upon the ferrule (as shown in FIG. 5), such as upon contact of the ferrule, and specifically the ferrule chamfer, with the internal chamfer of the sleeve, the front face of the ferrule is isolated from the groove, such as by a seal formed between the ferrule or ferrule chamfer and the internal chamfer of the sleeve. Thus, contaminants and other debris that may enter the groove cannot be deposited upon the front face of the ferrule.

Typically, the internal chamfer 24 is spaced apart from the second end 16 of the sleeve 12 by a distance sufficient to prevent any contaminants and other debris on the second end of the sleeve from being transferred to the front face of the ferrule. For those embodiments of the dust cap 10 that include a lens 22, the spacing between the internal chamfer and the lens is also preferably selected such that the resulting axial separation between the front face of the ferrule and the lens approximately equals the focal length of the lens or lens combination. As such, the dust cap can effectively support optical communications with the optical fiber upon which the ferrule is mounted.

The dust cap 10 of the present invention is therefore designed to protect the front face of the ferrule upon which the dust cap is mounted from contaminants and other debris. In this regard, the dust cap is designed such that the internal chamfer 24 engages the ferrule in order to space the front face of the ferrule from the closed second end 16 of the dust cap by a distance sufficient to prevent the transfer of any contaminants and other debris from the closed second end to the front face of the ferrule. In addition, the dust cap is designed such that once the dust cap is fully mounted upon the ferrule, the front face of the ferrule is isolated from the groove 28 that facilitates venting of the air from within the bore during the mounting of the dust cap upon the ferrule, thereby preventing contaminants and other debris that might enter the groove from ever being deposited upon the front face of the ferrule. Since at least the end member 20 of the dust cap is translucent and, in some embodiments, includes a lens 22, the dust cap of the present invention supports optical communications with the optical fiber upon which the ferrule is mounted while the dust cap remains mounted upon the ferrule. By way of illustration, a method of testing the continuity of an optical fiber jumper 30 according to another aspect of the present invention is hereinafter described.

As described above, optical fiber jumpers 30 must generally be checked for continuity immediately prior to packing and shipping the optical fiber jumpers to minimize the number of defective jumpers that are delivered to a customer. In this regard, an optical fiber jumper typically includes at least one optical fiber 32 and first and second fiber optic connectors 34 mounted upon the opposed ends of the at least one optical fiber. The optical fiber jumper also includes first and second dust caps 10 that are mounted upon the ferrules of the first and second fiber optic connectors, respectively. Prior to packing the optical fiber jumper, a light source 36 can be positioned adjacent the end of the optical fiber jumper upon which the first fiber optic connector is mounted so as to introduce signals through the dust cap to the at least one optical fiber upon which the first fiber optic connector is mounted. Additionally, a detector 38, such as a photodetector, can be positioned proximate the other end of the optical fiber jumper upon which the second fiber optic connector is mounted in order to detect the optical signals emitted by the at least one optical fiber upon which the second fiber optic connector is mounted.

According to this aspect of the present invention, the dust caps 10 remain mounted upon the ferrules of the first and second fiber optic connectors 34 while the optical signals are introduced into and emitted from the optical fibers 32. In fact, in those embodiments in which the dust caps include a lens 22, the lens of the dust cap mounted upon the ferrule of the first fiber optic connector actually serves to focus the incident light upon the end of the optical fibers upon which the ferrule is mounted. Likewise, the lens of the dust cap mounted upon the ferrule of the second fiber optic connector serves to expand the light emitted by the optical fibers upon which the second fiber optic connector is mounted in order to facilitate the subsequent detection of the optical signals by the detector 38.

By permitting the continuity of the optical fiber jumper 30 to be checked without removing the dust caps 10 from the ferrules of the fiber optic connectors 34, the method of this aspect of the present invention prevents any additional contaminants and other debris from being deposited upon the front face of the ferrules, the likelihood of which would be increased as a result of the electrical charging of the ferrules that would occur if the dust caps were slideably removed from the ferrules. In addition, the method of this aspect of the invention also simplifies the continuity test somewhat by not requiring the operator to remove and subsequently replace the dust caps on both ends of the optical fiber jumper.

Accordingly, the dust cap 10 of the present invention protects the cleanliness of the front face of the ferrule by preventing contaminants and other debris from being deposited upon the front face of the ferrule following its polishing. In particular, the dust caps can be designed to be transparent such that the dust caps can remain mounted upon the ferrules of the respective fiber optic connectors 34 as the continuity of an optical fiber jumper 30 is tested. In addition, the dust caps can include lenses 22 that further facilitate continuity testing by focusing the incident light upon the optical fibers and by expanding the light emitted by the optical fibers. By reducing the amount of contaminants and other debris that are deposited on the front face of the ferrules, the dust cap of the present invention therefore helps to improve the performance of the optical system in which the optical fibers, such as the optical fiber jumpers, are eventually installed since the contaminants and other debris would otherwise degrade the system performance.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for testing continuity of an optical fiber jumper, the method comprising:

providing the optical fiber jumper comprising at least one optical fiber, first and second fiber optic connectors including respective ferrules mounted upon opposed ends of said at least one optical fiber, and at least one dust cap having a translucent end member mounted upon a respective ferrule;

introducing light into one end of the at least one optical fiber; and monitoring the light emitted by the other end of the at least one optical fiber to thereby check the continuity of the optical fiber jumper, wherein said introducing and monitoring are performed while the at least one dust cap is mounted upon the respective ferrule.

2. A method according to claim 1 wherein providing the optical fiber jumper comprises providing an optical fiber jumper having first and second dust caps with translucent end members mounted upon the ferrules of the first and second fiber optic connectors, respectively.

3. A method according to claim 2 wherein the end member of each dust cap comprises a lens, and wherein introducing light comprises focusing light into one end of the at least one optical fiber.

4. A method according to claim 2 wherein the end member of each dust cap comprises a lens, and wherein monitoring the emitted light comprises expanding the light emitted by the other end of the at least one optical fiber.

* * * * *